Sept. 4, 1928. 1,683,489
C. W. RICE
SCALE AND CORROSION DETECTOR
Filed June 15, 1927
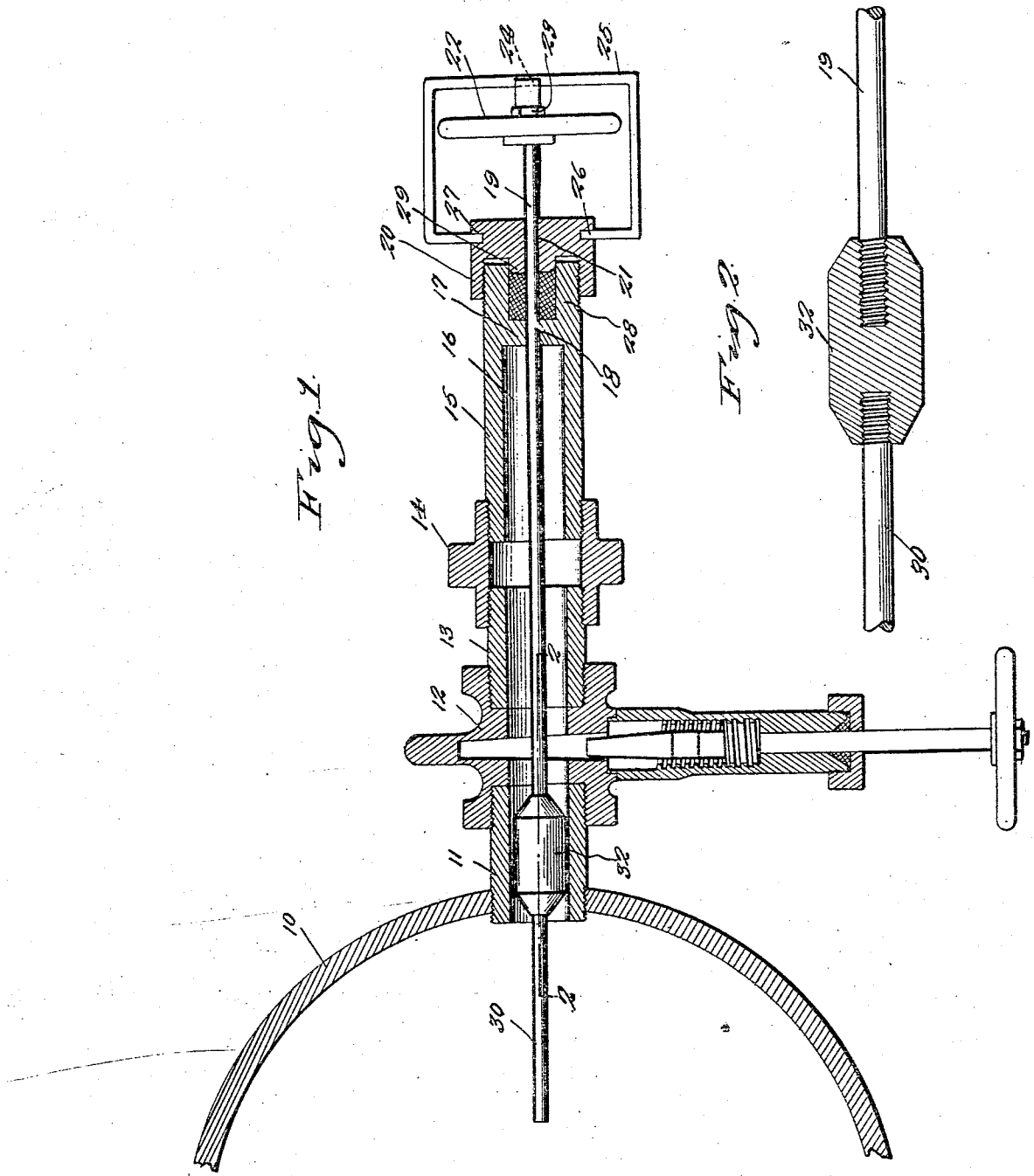

Patented Sept. 4, 1928.

1,683,489

UNITED STATES PATENT OFFICE.

CYRUS WILLIAM RICE, OF PITTSBURGH, PENNSYLVANIA.

SCALE AND CORROSION DETECTOR.

Application filed June 15, 1927. Serial No. 199,048.

The object of this invention is to provide means for detecting the corrosive properties of water or steam, by permitting action of the fluid on an element of metal and usually of steel, and inserted into a steam duct, main, or water container, in the special manner indicated below, the nature of any deposit formed also being determined.

A further object is to provide for mounting a detector element by means of a body of insulation carried by one end of a rod slidable thru a tubular element into which the detector per se is withdrawn, this tubular element being detachable from a pipe connection secured to a valve housing, said housing being itself secured to a short pipe or nipple which normally receives the body of insulation.

A further object is to provide a valve for cutting off the flow of steam or water from the pipe, duct or container when the metallic element has become corroded or has become covered with deposit, or both, and is to be withdrawn into the detachable tubular element for the purpose of study and investigation in determining the character of the water or steam, or of the particles held in suspension thereby.

With the foregoing and other objects in view, the invention consists in the novel construction and arrangement of elements described, illustrated and claimed, it being understood that modifications may be made within the scope of the claims without departing from the spirit of the invention.

A feed line or steam main is designated 10, and a nipple 11 is threaded into an opening in the line, and is also threaded into the housing or casing of valve 12. This housing also has threaded connection with nipple 13, and a pipe union or coupling 14 connected with nipple 13 also has connection with tubular element 15 providing a chamber therein as shown at 16.

The tubular element 15 has an inner reduced annular portion, or rather portion providing a reduced bore, this part being designated 17, and the bore being shown at 18, permitting of the free passage therethru of rod 19. The cap 20 is threaded onto the end of tubular member 15, and is provided with a central bore 21 for the free passage therethru of rod 19. This element last named is controlled by a hand wheel 22 retained in position by a threaded element 23 having a cutaway portion or channel 24 therein, for the reception of a bail-like member 25, which may also be termed a yoke or U-member. The element 25 has inwardly turned ends 26 adapted for reception within the openings 27 in opposite sides of the cap 20, and the element 25 when in operative position retains rod 19 in an inner position, for the purpose indicated below.

A packing box is designated 28, and a gland or the like is shown at 29, and serves an obvious purpose.

The detector or detector rod is designated 30, and is of any suitable metal,—steel, such as boiler steel, usually being employed. This rod is threaded on its inner end, and is received by a body termed a coupling 32, the latter having bores in its opposite ends, internally threaded and the outer bore receiving one end of rod 19. The element 32 is of insulating material in order to avoid any galvanic action which would otherwise be set up between the elements 30 and 32 if they were of different metallic structure. The coupling 32 is of slightly less diameter than the bore of nipple 11, and the entire device including rod 19, coupling 32 and detector element 30 is slidable outwardly when the detector is to be removed for the purpose of determining the corroding effects of impurities contained in the water or steam, or the tendency to form deposits.

When the retaining element or yoke 25 has been freed from the element 24, rod 19 and the connected elements are moved outwardly beyond the valve 12, then to be closed, and the coupling 32 and rod 30 pass into the chamber 16 of element 15. The coupling or union 14 is detached, and the structure at the right may then be readily handled and the detector 30 removed from coupling 32, for examination in the manner indicated. The fact that element 32 is of insulating material and of non-corrosive material, renders it certain that the examination of the character of the corrosion of element 30 will give a true result.

Having described the invention what is claimed is:—

1. In a device of the class described, a tubular element for connection with a steam main or the like, a valve connected with said element, a second tubular element connected with the valve, a rod extending thru the second tubular element, a corrosion detector element adapted to project into the steam main, and removable from the main by imparting longitudinal movement to the rod, and a coupling of insulating material between the rod and the detecting element.

2. In a device of the class described, a tubular element for connection with a steam main or the like, a valve connected with said element, a second tubular element connected with the valve, means for closing the outer end of the second tubular element, a rod extending thru said tubular elements, a corrosion detecting element adapted to project into the steam main, and removable from the main by imparting longitudinal movement to the rod, and a coupling of insulating material between the rod and the detecting element, and connected therewith.

3. In a device of the class described, a tubular element, means for closing one end of this element, a coupling secured to the opposite end of said element, a valve including a valve casing secured to the coupling, a second tubular element communicating with the valve casing and adapted to be detachably connected with a steam main or the like, a rod passing thru the tubular elements, the coupling, and the valve casing, a body of insulation connected with the rod, and a detecting element detachably connected with the body of insulation and adapted to project into the steam main.

4. In a device of the class described, a corrosion detecting element adapted to project into a steam main or the like, a member for mounting the detecting element, detachable tubular means secured to the main and into which said mounting member and detecting element are removable from the main, and means for preventing the passage of fluid from the main through the tubular means.

In testimony whereof I affix my signature.

CYRUS WM. RICE.